(12) United States Patent
Abe et al.

(10) Patent No.: US 8,036,071 B2
(45) Date of Patent: Oct. 11, 2011

(54) WOBBLE INFORMATION RECORDING METHOD, INFORMATION RECORDING MEDIUM, AND RECORDING AND REPRODUCTION METHOD AND APPARATUS THEREOF

(75) Inventors: Shinya Abe, Osaka (JP); Takashi Ishida, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/121,141

(22) Filed: May 15, 2008

(65) Prior Publication Data

US 2008/0219139 A1   Sep. 11, 2008

Related U.S. Application Data

(62) Division of application No. 10/577,926, filed as application No. PCT/JP2005/008838 on May 10, 2005, now abandoned.

(30) Foreign Application Priority Data

May 11, 2004   (JP) ................. P2004-140652

(51) Int. Cl.
   *G11B 21/08*   (2006.01)
(52) U.S. Cl. .............. 369/30.04; 369/275.3; 369/59.25; 369/47.22
(58) Field of Classification Search .............. 369/275.3, 369/275.4, 47.19, 59.25, 124.04, 47.22, 275.1, 369/94, 30.04
   See application file for complete search history.

(56) References Cited

U.S. PATENT DOCUMENTS

| | | | |
|---|---|---|---|
| 5,537,373 | A | 7/1996 | Horikiri |
| 6,088,307 | A | 7/2000 | Fushimi et al. |
| 6,091,700 | A | 7/2000 | Kobayashi |
| 6,172,952 | B1 | 1/2001 | Inokuchi et al. |
| 6,226,239 | B1 | 5/2001 | Nishiuchi et al. |
| 6,577,590 | B2 | 6/2003 | Minamino et al. |
| 6,667,949 | B2 | 12/2003 | Stek et al. |
| 6,690,641 | B2 | 2/2004 | Miyamoto et al. |

(Continued)

FOREIGN PATENT DOCUMENTS

JP   2003-109246   4/2003

(Continued)

OTHER PUBLICATIONS

Russian Office Action issued Nov. 5, 2008 in Russian Application No. 2006121256/28(023079) (with English translation).

(Continued)

*Primary Examiner* — Hoa T Nguyen
*Assistant Examiner* — Kim-Kwok Chu
(74) *Attorney, Agent, or Firm* — Wenderoth Lind & Ponack, L.L.P.

(57) ABSTRACT

An optical disk and a method for identifying the optical disk making it possible to identify a recording system of the optical disk easily in a short time by a recording and reproduction apparatus when a groove-recording system and a land-recording system are both employed in one kind of optical disk, such as, for example, a BD-R. Specifically, a polarity upon reproducing wobble information is made to be the same in both an optical disk of groove-recording system and the optical disk of a land-recording system. The recording system of the optical disk that shows the same wobble polarity irrespective of the recording system can be easily detected by finding a tracking polarity that can recognize the wobble information by changing the tracking polarity, whereby the start-up time of the recording and reproduction apparatus can be shortened.

4 Claims, 6 Drawing Sheets

U.S. PATENT DOCUMENTS

| | | | |
|---|---|---|---|
| 6,728,197 | B2 | 4/2004 | Miyamoto et al. |
| 6,847,594 | B1 | 1/2005 | Lee |
| 6,973,020 | B2 | 12/2005 | Shoji et al. |
| 6,999,391 | B2 | 2/2006 | Heemskerk et al. |
| 7,123,557 | B2 * | 10/2006 | Heemskerk et al. ....... 369/47.19 |
| 7,123,574 | B2 | 10/2006 | Shoji et al. |
| 7,221,644 | B2 | 5/2007 | Kobayashi et al. |
| 7,224,651 | B2 | 5/2007 | Ko et al. |
| 7,313,062 | B2 | 12/2007 | Kobayashi |
| 7,417,942 | B2 * | 8/2008 | Miyamoto et al. ......... 369/275.3 |
| 2001/0050888 | A1 | 12/2001 | Eguchi et al. |
| 2002/0039346 | A1 | 4/2002 | Abe et al. |
| 2002/0067666 | A1 | 6/2002 | Maeda et al. |
| 2003/0002427 | A1 | 1/2003 | Lee et al. |
| 2003/0021206 | A1 | 1/2003 | Tomita |
| 2003/0058782 | A1 | 3/2003 | Kondo |
| 2003/0202436 | A1 | 10/2003 | Tomita et al. |
| 2004/0095857 | A1 | 5/2004 | Stek et al. |

FOREIGN PATENT DOCUMENTS

| | | |
|---|---|---|
| JP | 2003-517171 | 5/2003 |
| JP | 2003-203402 | 7/2003 |
| WO | 01/80227 | 4/2001 |
| WO | 03/034414 | 4/2003 |
| WO | 2004/025639 | 3/2004 |

OTHER PUBLICATIONS

Office Action issued Dec. 10, 2008 in U.S. Appl. No. 10/577,926.
International Search Report issued Oct. 24, 2005 in International Application No. PCT/JP2005/008838.
Written Opinion of the International Search Authority issued Oct. 24, 2005 in International Application No. PCT/JP2005/008838.
Office Action issued Apr. 1, 2009 in U.S. Appl. No. 12/121,195.
Office Action issued Jun. 9, 2009 in corresponding U.S. Appl. No. 12/121,166, filed May 15, 2008.
Office Action dated May 11, 2010 issued in U.S. Appl. No. 12/121,224.
Office Action mailed Sep. 14, 2009 in U.S. Appl. No. 12/121,224.
Office Action dated Jan. 31, 2011 issued in corresponding Canadian Application No. 2 544 904.
Office Action dated Apr. 13, 2011 in U.S. Appl. No. 12,121,224, filed May 15, 2008 (Abe et al.).

* cited by examiner

WOBBLE INFORMATION RECORDING METHOD, INFORMATION RECORDING MEDIUM, AND RECORDING AND REPRODUCTION METHOD AND APPARATUS THEREOF

This is a divisional of application Ser. No. 10/577,926 filed on May 1, 2006 now abandoned, which is the National Stage of International Application No. PCT/JP2005/008838, filed May 10, 2005.

BACKGROUND OF THE INVENTION

1. Field of the Invention

The present invention is related to a method for recording wobble information of an information recording medium such as an optical disk so that a polarity of detected wobble information is the same irrespective of the recording system, and an information recording medium wherein the wobble information is recorded according to the method. Further, the present invention is related to a method and apparatus for recording and reproducing information using the information recording medium.

2. Description of the Related Art

Conventionally, CD-R/RW and DVD-R/RW/RAM have been used as a write-once or a rewritable optical disk and recently demand for a DVD-R/RW/RAM has been increased since DVD recorders have widely prevailed for recording TV broadcasts. A guide groove is provided in these optical disks and reference signals for synchronizing a linear velocity upon recording and reproducing and optional address information signals are recorded in these optical disks by "wobble" signals which are a meander of the guide groove. A recording and reproduction apparatus for such an optical disk records and reproduces information by detecting the wobble signals to adjust the linear velocity and by detecting the address if the address information is added to the optical disk. Of the above optical disks, the DVD-RAM employs a recording system (or a recording mode) which may be called a "land & groove" recording system according to which recording and reproduction of information are carried out on both land portions (that are faces far from a light used for recording and reproduction) and the groove portions (that are faces near to the light) of the guide groove, and all the other optical disks employ a groove recording system according to which the recording and reproduction of information are carried out only on the groove portions (that are faces near to the light used for recording and reproduction) of the guide groove.

Recently, an optical disk having a recording density that is higher than the DVD has been developed. In general, information is recorded on and reproduced from the optical disk by an incident light for recording and reproduction which light passes through a transparent layer which may be called a "substrate." The thickness of the substrate, through which the light for recording and reproduction passes, is 0.6 mm for the DVD. A study has been made for further thinning the thickness of the substrate into about 0.1 mm and thereby using a light with a short wavelength for recording and reproduction. As a result, a recordable Blu-ray Disc (BD) has been developed.

In the case where the thickness of the substrate is thin such as 0.1 mm, it is difficult to form the guide groove in the sheet having a thickness of 0.1 mm and to form the recording layer on its surface. For this reason, an approach for producing the Blu-ray Disc is made wherein the guide groove is formed in a substrate of a 1.1 mm thickness which is to be positioned at the side (rear side) that is not irradiated with the light for recording and reproducing and the recording layer is formed on the guide groove followed by forming a cover layer of a 0.1 mm thickness. In this case, the light for recording and reproducing is applied from the side of the cover layer.

When the recording layer is formed by sputtering a material forming the recording layer onto the surface of the rear-side substrate, the recording layer can be deposited and formed so that the thickness of the recording layer in the groove portions (the top surface of the guide groove) is almost the same as that in the land portions (the bottom surface of the guide groove) viewed from the cover layer side where the light for recording and reproducing is applied. Therefore, in this case, the portions that present better recording and reproduction characteristics, which is generally the groove portions, can be used for recording and reproduction.

Further, there is a method for applying an organic dye by a spin-coat method, as a method for forming the recording layer. For example, Japanese Patent Kokai (Laid-Open) Publication No. 2003-109246(A) describes a method for producing a write-once optical disk which includes forming the recording layer by applying the organic dye on the rear-side substrate by the spin-coat method and then forming the cover layer. However, according to the spin coat method, the organic dye preferentially deposits in the groove portions (concaved portions) of the substrate. As a result, the recording layer is formed thickly in the land portions when viewed from the cover layer side. Therefore, since the recording film is easily formed in the land portions in this case, it is preferable that the land portions are used for recording and reproduction.

BRIEF SUMMARY OF THE INVENTION

As described above, an appropriate recording system depends on the method for forming the recording film. However, when tracking is conducted by, for example, a push-pull method, tracking characteristics obtained when using the groove portions as the recording layer is reversal of those when using the land portion as the recording layer. Similarly, a polarity of wobble signals obtained in reproduced signals when reproducing the signals recorded in the groove portions is reversal of a polarity of wobble signals obtained in reproduced signals when reproducing the signals recorded in the land portions.

In a recording and reproduction apparatus, a circuit for tracking is generally separated from a circuit for detecting wobble signals. For this reason, when it is desired that a single recording and reproduction apparatus accepts two types of optical disks, one being of the groove recording system, and the other being of the land-recording system, it is necessary to (i) detect whether the portions to be used for recording are groove portions or land portions and (ii) detect the wobble signal polarity for a loaded optical disk, which results in a problem that a longer time is required for start-up.

Figure 6:
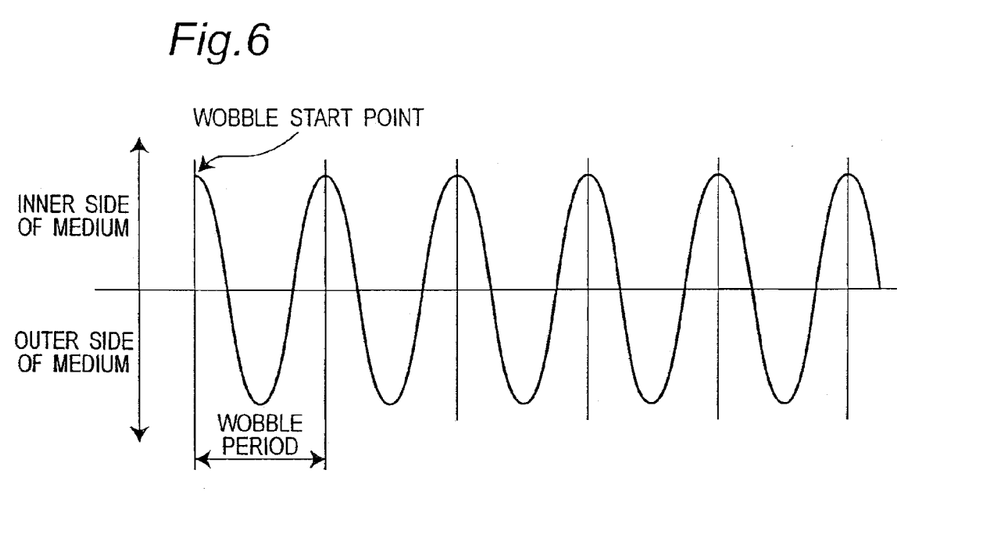
FIG. 6 is a schematic view showing an example of wobble of a guide groove formed in an information recording medium of groove-recording system, according to a method of the present invention.
Figure 7:
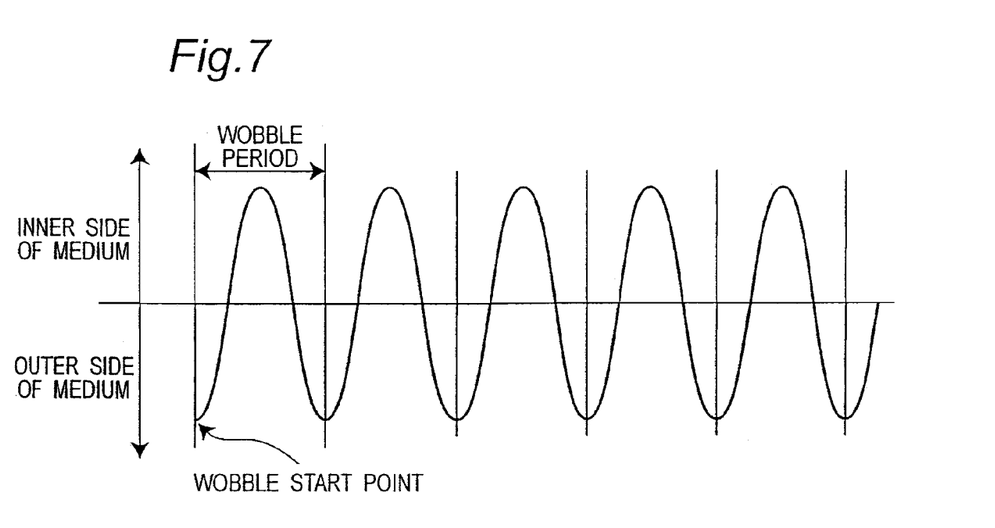
FIG. 7 is a schematic view showing an example of wobble of a guide groove formed in an information recording medium of land-recording system, according to a method of the present invention.

In order to resolve this problem, the present inventors propose that the polarity obtained upon reproducing the wobble signals is made the same in both the information recording medium of a land-recording system and the information recording medium of a groove-recording system. Specifically, the polarity of wobble signals formed in the optical recording medium, which employs one recording system, is made mirror reverse of that formed in the optical recording medium which employs the other recording system. More specifically, the physical direction of the wobble (specifically, right and left of starting direction of the wobble, that is, whether the wobble starts its first wobble deviation towards the inner side or the outer side of the medium), in the case of the groove-recording system, is reversed in the case of the land-recording system so that the polarity of the wobble signals in the case of the land-recording system is made to be the same as the polarity of the wobble signals in the case of the groove-recording system. Herein, the phrase "the wobble starts its first wobble deviation towards the inner side of a medium" means that a starting point of the wobble is positioned at the innermost of the medium (a position nearer to the center in the case of a disk) relative to a position where a wobble amplitude is zero and the wobble starts from the starting point as shown in FIG. 6. The phrase "the wobble starts its first wobble deviation towards the outer side of a medium" means that a starting point of the wobble is positioned at the outermost of the medium relative to a position where the wobble amplitude is zero and the wobble starts from the starting point as shown in FIG. 7. Both wobbles shown in FIGS. 6 and 7 are monotone wobbles. Timing and address information by MSK (Minimum Shift Keying) modulation and HMW (Harmonic Modulated Wave) modulation are optionally incorporated into the monotone wobble.

Thus, the present invention provides a method for recording wobble information of an information recording medium which includes:

selecting a recording system; and forming a guide groove having wobble information wherein the wobble starts its first wobble deviation towards the inner side of the medium in the case where the selected recording system is a groove-recording system, or a guide groove having wobble information wherein the wobble starts its first wobble deviation towards the outer side of the medium in the case where the selected recording system is a land-recording system. This is particularly applicable to an optical disk on and from which information is recorded and reproduced with a light. This method makes it possible that the polarity of the wobble signals of the information recording medium of a groove-recording system is the same as that of the information recording medium of the land-recording system. According to this method, an information recording medium of groove-recording system, wherein a wobble starts its first wobble deviation towards the inner side of the medium in a guide groove having wobble information, and an information recording medium of land-recording system, wherein a wobble starts its first wobble deviation towards the outer side of the medium in a guide groove having wobble information can be obtained.

Further, the present invention provides a method for recording wobble information of a multi-layer information recording medium having a plurality of recording layers, which includes making the wobble polarity that is detected from all the recording layers to be the same, and a multi-layer information recording medium having a plurality of recording layers wherein wobble information is recorded according to this method. In such an information recording medium, the wobble starts its first wobble deviation towards the inner side or the outer side of the medium in a guide groove having wobble information for each recording layer depending on a recording system of each recording layer. Herein, the terms "a guide groove for a certain recording layer" means a groove for guiding a light used for recording information on the certain recording layer and reproducing the information from the certain recording layer.

Furthermore, the present invention provides a method for recording information on and reproducing information from an information recording medium of the present invention, which includes judging a tracking polarity peculiar to a loaded information recording medium (particularly, an optical disk), based on the result of whether or not wobble information is detected from wobble signals under a fixed tracking polarity. Further, the present invention provides a recording and reproduction apparatus which is used for carrying out this method.

In the above-mentioned recording and reproduction method and apparatus, the default of the tracking polarity may be preferably one for a groove-recording system. Since many optical disks conventionally employ the groove-recording system, it may be considered that many unspecified optical disks also employ the groove-recording system. For this reason, the default of the tracking polarity is one for the groove-recording system and a detection time required for detecting an optical disk of the groove-recording system can be shortened, whereby the start time when the unspecified optical disk is loaded can be shortened.

This invention makes it possible to omit the time required for a recording and reproduction apparatus to study the wobble polarity of each optical disk, irrespective whether its recording system is the groove-recording system or the land recording system. Further, the recording system of the information recording medium of the present invention can be easily judged by detecting whether or not the wobble information is obtained from the wobble signals when tracking is carried out under a predetermined polarity.

Here, in FIGS. 1 to 7, the reference numbers represent the following elements:

101 . . . substrate, 102 . . . recording film, 103 . . . overcoat, 104 . . . UV curable resin layer, 105 . . . PC sheet, 201 . . . laser, 202 . . . light regulator, 203 . . . deflector, 204 . . . beam expander, 205 . . . movable optical bench, 206 . . . master, 207, 208 . . . mirror, 209 . . . formatter, 210 . . . objective lens, 301 . . . optical disk, 302 . . . objective lens, 303 . . . mirror, 304 . . . photodetector, 305, 306 . . . preamplifiers, 307 . . . differential amplifier, 308 . . . tracking circuit, 309 . . . wobble detecting circuit, 501 . . . substrate, 502 . . . second recording film, 503 . . . intermediate layer, 504 . . . first recording film, 505 . . . UV curable resin layer, and 506 . . . PC sheet.

DETAILED DESCRIPTION OF THE INVENTION

The embodiments of the present invention are described with reference to the attached drawings.

First Embodiment

Figure 1:
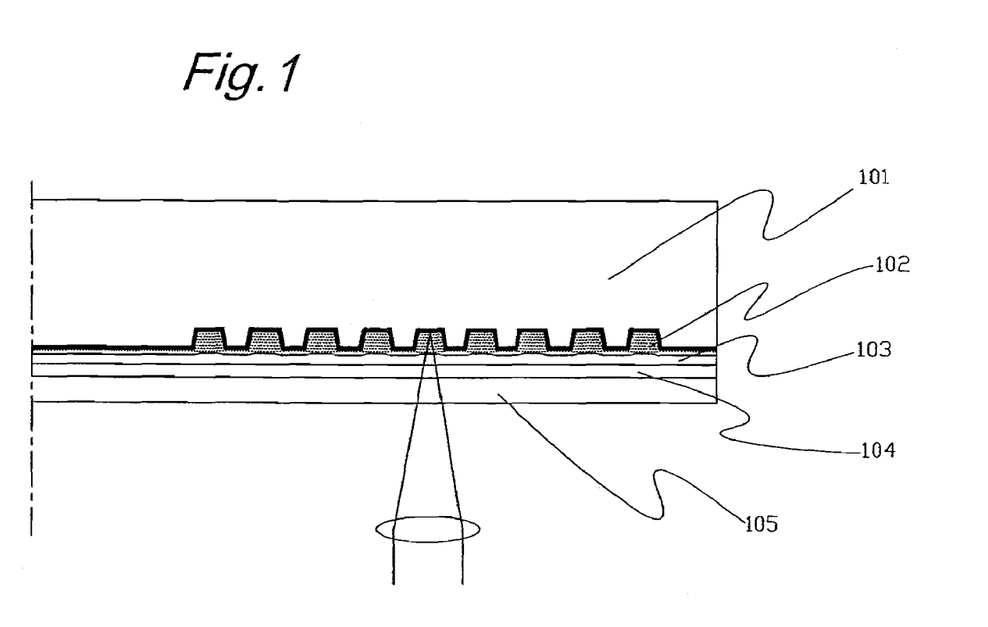
FIG. 1 is a schematic view of an optical disk according to a first embodiment of the present invention.

FIG. 1 shows a schematic view showing a construction of an optical disk according to the first embodiment of the present invention. The optical disk includes a substrate 101, a recording film 102 formed on a surface of the substrate 101, an overcoat layer 103 formed on a surface of the recording film 102 and a sheet 105 bonded to the overcoat layer 103 through an adhesive layer 104. The substrate 101 is a substrate (or plate) which is formed by injection molding and has a guide groove wherein wobble information is recorded on its surface where the recording film 102 is formed. The substrate 101 has a thickness of about 1.1 mm. The recording film 102 may be formed by, for example, a spin coat method using an organic dye. The overcoat layer 103 may be formed from a UV curable resin into a thickness of about 4 μm. The sheet 105 may be a polycarbonate sheet (PC sheet) having a thickness of about 80 μm, and it may be bonded to the overcoat layer 103 by the adhesive layer 104 of a UV curable layer.

A stamper provides the guide groove on the substrate upon the injection molding. That is, the stamper corresponds to a mold of the guide groove. The stamper may be produced using a master that is produced using a laser master recording apparatus.

Figure 2:
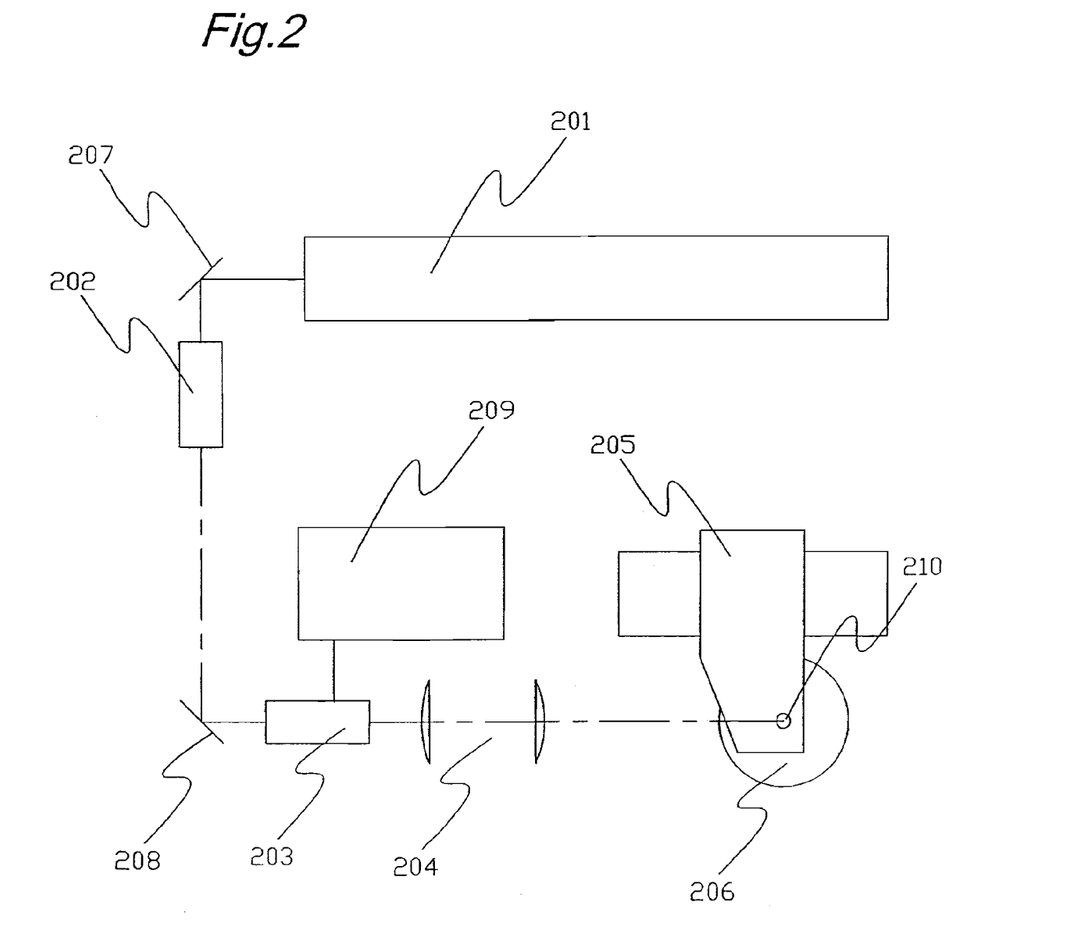
FIG. 2 is a schematic view of a laser master recording apparatus for producing a master of the optical disk according to the first embodiment of the present invention.

FIG. 2 is a schematic view showing a construction of the laser master recording apparatus. A light emitted from a light source that is a laser 201 (whose wavelength is 248 nm) is reflected on a mirror 207 and its intensity is adjusted in a light regulator 202. The light is further reflected on a mirror 208 and deflected by a deflector 203. At this moment, wobble information to be recorded is generated in a formatter 209 and introduced in the deflector 203. The diameter of the light deflected by the deflector is adjusted in a beam expander 204, focused by an objective lens 210 that is mounted in a movable optical bench 205, and applied to a master 206. A photoresist has been applied to the surface of the master 206 which is irradiated with the light. The master 206 is rotated on a spindle.

By changing the output polarity of the formatter 209, it is possible to change the physical direction of the wobble recorded in the master 206, that is, the direction of the first wobble deviation (that is, whether the wobble starts its first wobble deviation towards the inner side or the outer side of the disk). Therefore, the method for recording wobble information of the present invention can be carried out by determining the recording system of the optical disk to be produced, selecting the output polarity of the formatter based on the determination, and producing the master by means of this master recording apparatus, and producing the stamper from this master, and forming the guide groove in the surface of the substrate using this stamper.

In addition to reference frequency information which is used in order that a recording and reproduction apparatus synchronizes a linear velocity, address information may be added to the wobble information by mixing signals (STW; Saw Tooth Wobbles) that are added while advancing or delaying the phase of a wave having a double frequency relative to the reference frequency and signals having 1.5 times frequency of the reference frequency (MSK; Minimum Shift Keying).

In general, a Blu-ray Disc employs the groove-recording system. In that case, the wobble starts its first wobble towards the inner side of the medium, that is, the wobble starts at the inner side of the medium. In other words, the wobble starts at a point where the wobble amount (or an amplitude) is maximum on the inner side of the medium. Such a wobble is as shown in FIG. 6. As shown in FIG. 6, in the case of the groove-recording system, the starting point of the wobble is situated at the inner side of the medium.

In the first embodiment, the output characteristic of the formatter 209 is set so that the wobble starts its first wobble deviation towards the outer side of the disk, that is, the wobble starts at the outer side of the disk, considering that this disk employs the land-recording system. In other words, the output characteristic of the formatter 209 is set so that the wobble starts at a point where the wobble amount is at a maximum on the outer side of the disk. The wobble employed in the optical disk of land-recording system is as shown in FIG. 7, and the start point of the wobble is situated at the outer side of the disk.

Figure 3:
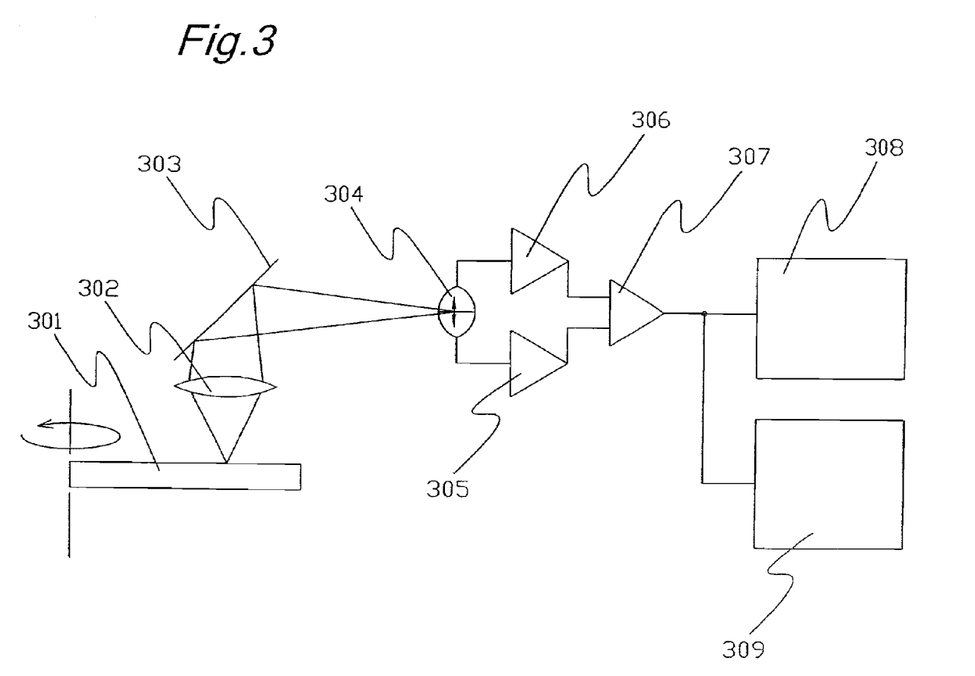
FIG. 3 is a block diagram of a signal reproduction circuit of the optical disk according to the first embodiment of the present invention.

FIG. 3 shows a block diagram for detecting tracking signals and wobble signals in a recording and reproduction apparatus at the time of recording information on and reproducing information from a fabricated optical disk. As shown in FIG. 3, a light reflected on an optical disk 301 is focused by an objective lens 302 and reflected on a mirror 303 and then introduced in a bisected photodetector 304. The section (or dividing) line is disposed perpendicular to movement of a radial direction of the optical disk.

Outputs of channels of the photodetector 304 are amplified by preamplifiers 305 and 306 respectively, become a differential signal in a differential amplifier 307, and the differential signal is input into a tracking circuit 308 and an address detecting circuit 309.

Figure 4:
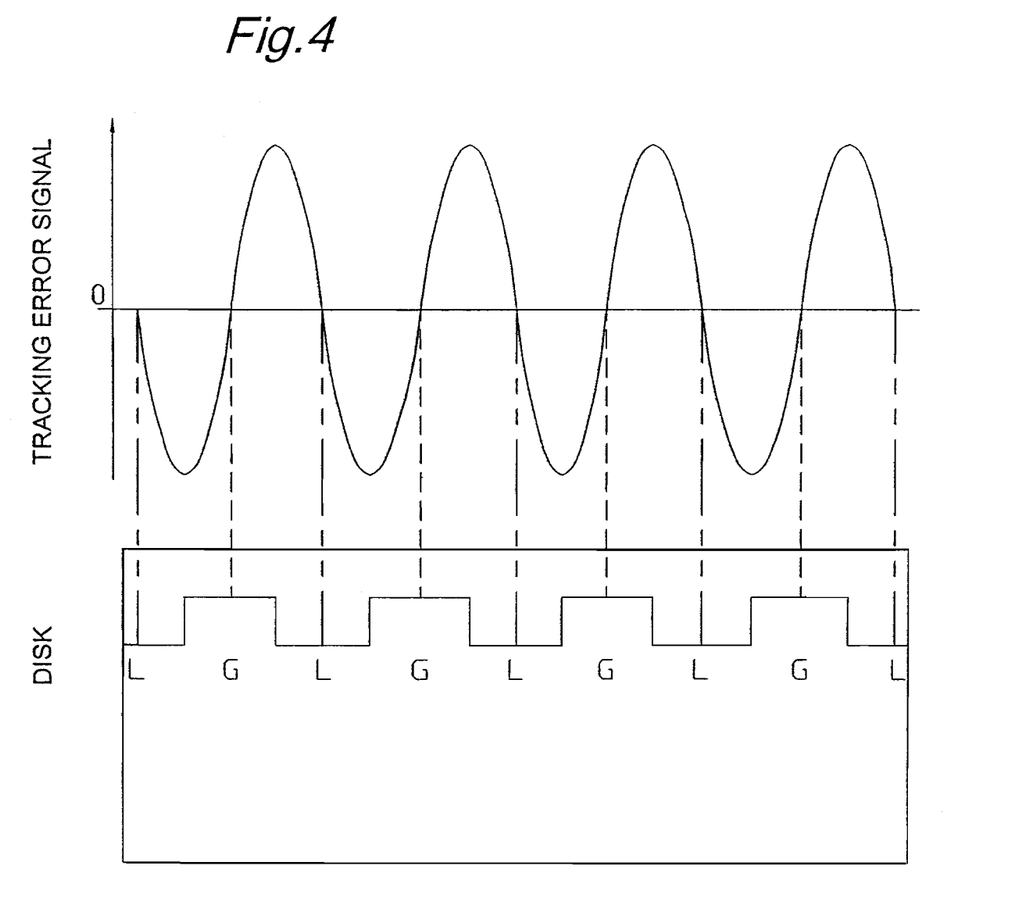
FIG. 4 is a schematic view describing a groove polarity and a tracking signal polarity of the optical disk according to the first embodiment of the present invention.

FIG. 4 shows the relationship between push-pull tracking error signals corresponding to the groove portions (G) and the land portions (L) when a spot of the light used for recording and reproduction traverses the guide groove. As shown in FIG. 4, the tracking error signals change as a substantially sinusoidal waveform depending the period of the guide groove. Although the error signals become zero at the center of the groove portion and at the center of the land portion, the inclination at the groove center is opposite to the inclination at the land center. The reproduced wobble signals are generated by sifting the groove or the land purposefully and its polarity is the same as that of the tracking error signals.

Therefore, in the case where a conventional master for an optical disk of land-recording system is used to produce an optical disk by, for example, a mothering method so that a predetermined information is recorded in land portions and the optical disk is used as one of land-recording system, the polarity of the reproduced wobble signals is reversed. In the first embodiment, the wobble recording polarity is opposite to that employed in a medium of groove-recording system. For this reason, even if the tracking polarity is adapted to the land portion, the wobble signals whose polarity is opposite to the tracking polarity are obtained. As a result, the polarity of reproduced wobble signals from the optical disk of the first embodiment becomes identical with the polarity of those from the optical disk of groove-recording system.

If the wobble does not start a first wobble deviation toward the outer side of the optical disk of the land-recording system, a method for reversing both the wobble-signal polarity and the tracking-signal polarity for a groove-recording system, by means of a common amplifier in a recording and reproduction apparatus, should be considered when recording information on and reproducing information from the optical disk. This method does not require that the wobble shape for the land-recording system is a reversal of the wobble shape for the groove-recording system. However, the frequency band of the wobble signals is significantly different from that of the tracking error signals (the former is several kHz and the latter is several tens of kHz), a mechanism wherein the wobble signal and the tracking error signal are separately managed using respective circuits designed specifically for respective signals has an advantage that the property of the recording and reproduction apparatus is maintained more easily compared to a mechanism which reverses the polarities using the common amplifier. In the following, a method and an apparatus for recording information in and reproducing information from an optical disk wherein the wobble information is recorded according to the method of the present invention.

The optical disk recording and reproduction apparatus of the present invention is used with its tracking polarity set for a groove-recording system and a land-recording system, preferably for the groove-recording system. When a conventional optical disk of groove-recording system is loaded in the recording and reproduction apparatus, wherein the tracking polarity is set for the groove-recording system and tracking is carried out with an appropriate mechanism, wobble information is detected from wobble signals. The detected information during this tracking may preferably address information included in the wobble information or another characteristic information from which a location on the disk can be identified. In the case of an optical disk of CLV (Constant Linear Velocity), the reference frequency signal may be detected as the wobble information. When the wobble information is detected by setting the tracking polarity for the groove-recording system, the loaded optical disk is identified as one of groove-recording system. When the wobble information is not detected, the tracking polarity is switched and the detection of wobble information is carried out again. After switching, when the wobble information is detected, the loaded optical disk can be identified as one of a land-recording system.

The optical disk of the first embodiment can be identified as being a land-recording system according to the latter procedure.

As described above, the number of combinations of the tracking polarity and the wobble polarity is reduced by always detecting a wobble polarity of an optical disk under the same polarity in a recording and reproduction apparatus, whereby a start-up time is reduced upon loading the optical disk.

Second Embodiment

Figure 5:
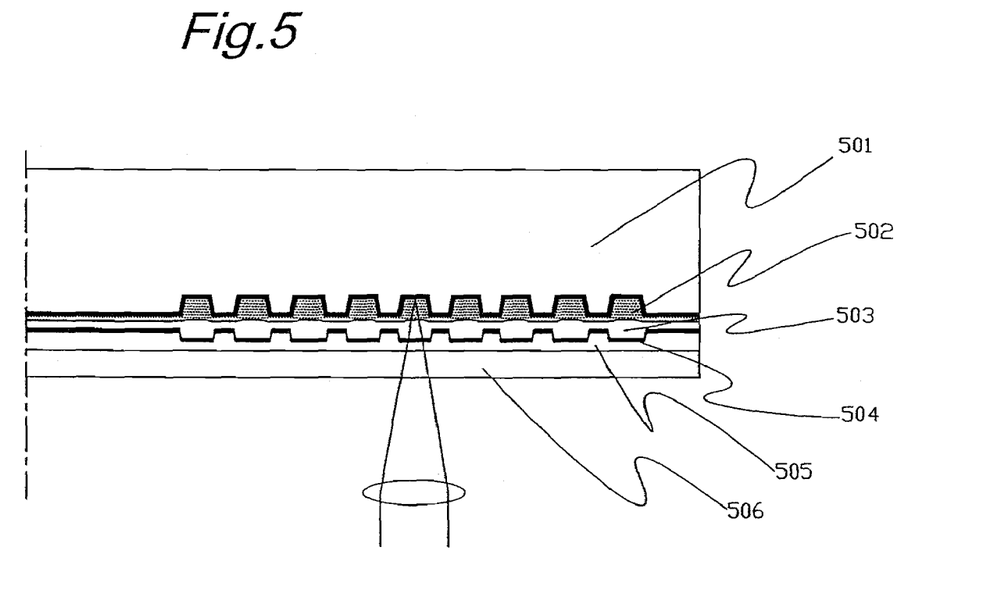
FIG. 5 is a schematic view of an optical disk according to a second embodiment of the present invention.

FIG. 5 is a schematic view showing a construction of an optical disk of a second embodiment. This disk has two recording films. A second recording film 502 which is located further from a laser light may be formed on a substrate 501 using an organic dye by a spin-coat method. The substrate 501 is produced in the same manner as in the first embodiment. Next, an intermediate layer 503 having a guide groove on its surface is stacked. The guide groove formed in the intermediate layer 503 is used to record information on and reproduce information from a first recording film 504 that is located near to the laser light and it also may be formed using a stamper which is produced from a master. The first recording film 504 whose main component may be a Te oxide film may be formed on a surface of the intermediate layer 503 by a sputtering method. A polycarbonate sheet (PC sheet) 506 having a thickness of about 65 μm is bonded to the surface of the second recording film 504 through a UV curable resin layer 505. A method for stacking the intermediate layer 503 is described in Japanese Patent Kokai (Laid-Open) Publication No. 2003-203402(A) that is incorporated herein by reference.

In this optical disk, the recording system of the second recording film 502 is a land-recording system, and the recording system of the first recording film 504 is groove-recording system. Therefore, the wobble guide groove is formed so that the wobble starts its first wobble deviation towards the outer side of the disk, that is, the wobble starts at the outer side of the disk, in the substrate 501 where the second recording film 502 is formed, while the wobble guide groove is formed so that the wobble starts its first wobble deviation towards the inner side of the medium, that is, the wobble starts at the inner side of the medium in the intermediate layer 503 for the first recording film 504. Each wobble guide groove for each recording layer is also formed by producing a master that determines the shape of the guide groove with a laser master recording apparatus so as to record wobble information in a predetermined manner, and forming the substrate 501 or the intermediate layer 503 by means of a stamper that is formed by the master.

This construction enables a two-layer optical disk to be obtained, wherein the tracking polarities of both recording layers are different from each other, while the detecting polarity of the wobbles of both recording layers are the same.

Also for this optical disk, the tracking polarity of each recording layer can be easily identified according to the procedure for distinguishing an optical disk of a groove-recording system from an optical disk of a land-recording system with use of a recording and reproduction apparatus as mentioned above, in a manner as described in connection with the first embodiment. Therefore, the start-up time is shortened by using the above-mentioned optical disk and recording and reproduction apparatus, which is provided with a mechanism for tracking each recording layer.

As the second embodiment, the two-layer optical disk is described which has two recording layers whose recording systems are different from each other. Of course, a similar construction may be applied to an optical disk wherein the recording systems of the first and the second recording layers are the same. For example, in the case where the recording systems of the first and the second recording layers are both groove-recording systems, the guide grooves are formed in the substrate and the intermediate layer so that wobbles start their first wobble deviation towards the inner side of the medium. Further, a similar construction is applicable to a multi-layer optical disk having more than two recording layers (for example, an optical disk having four recording layers). The optical disk having four recording layers has a combination wherein land portions or groove portions are used for recording in each of the four recording layers. The combination may be, for example, a construction wherein groove-groove-groove-groove-recording systems are employed in the respective layers in this order from the side near to a laser light, or a construction wherein groove-groove-groove-land-recording systems are employed in the respective layers in this order from the side near to a laser light.

In the first embodiment and the second embodiment, the physical polarity of the wobble is reversed on the optical disk. Alternatively, the polarity of the reproduced wobble signals can be reversed by changing a depth of the guide groove. To this end, the depth of the guide groove or the refractive index of a material for the recording layer may be adjusted so that a difference between the optical path length of a light reflected on a groove portion and the optical path length of a light reflected on a land portion is not less than $\lambda/2$ and not greater than $\lambda$ ($\lambda$: a wavelength of a light used for recording and reproduction).

As described above, by recording wobble information according to the present invention, there is an advantage that detection of the recording system of an optical disk (that is, detecting whether the optical disk employs a groove-recording system or a land-recording system) can be easily made, and therefore the start-up time can be shortened upon loading the optical disk into the recording and reproduction apparatus. The present invention can be applied to various recordable disks, such as a BD-R, a BD-RE, a DVD-R, and a DVD-RW. The present invention may be preferably applicable to the BD-R on and from which information is recorded and reproduced with a laser beam having a wavelength in a blue-violet region (specifically, about 405 nm).

The method for recording wobble information of the present invention is characterized in that the polarity of wobble information is made to be the same irrespective of the recording system (a groove-recording system or a land-recording system) of an information recording medium. Therefore, the present invention is advantageously applied particularly to an information recording medium as to which both recording systems are allowed (that is, coexisting) according to a specification (or a standard).

Further, the method and apparatus for recording and reproducing information of the present invention using the optical disk of the present invention employs a specific procedure and thereby makes it possible to reduce the load on the recording and reproduction apparatus which load is added until the apparatus identifies the recording system of the information recording medium. As a result, the recording and reproduction method and apparatus, wherein the time required for start-up is reduced, can be realized.

The invention claimed is:

1. A method of producing an information recording medium having a recording format, such that (i) information can be recorded to a recording track of a recording layer according to only one of a groove recording system and a land recording system, and (ii) the recording track to which the information can be recorded has a wobbled track including a wobble and address information added to the wobble by performing MSK (Minimum Shift Keying) modulation and HMW (Harmonic Modulated Wave) modulation to a reference frequency signal of the wobble, the method of producing the information recording medium comprising:

a step of forming the recording layer of the information recording medium, such that the formed recording layer includes a land track and a groove track that is closer to an incident laser beam than the land track, wherein the recording track of the formed recording layer is only one of the land track and the groove track, the step of forming the recording layer comprising:

selecting one of the land recording system, which allows information to be recorded only on the land track as the recording track, and the groove recording system, which allows information to be recorded only on the groove track as the recording track;

setting a first wobble deviation of the wobble on the recording track at a beginning point of the wobbled track, such that a physical direction toward which the first wobble deviation starts from the beginning point of the wobbled track only when the land recording system is selected is a mirror reverse of a physical direction toward which the first wobble deviation starts from the beginning point of the wobbled track only when the groove recording system is selected; and forming the wobble, to which the address information is added, on the wobbled track on the recording track of the recording layer according to (i) only the selected one of the land recording system and the groove recording system, and (ii) the first wobble deviation of the wobble set by the setting of the first wobble deviation of the wobble.

2. The method according to claim 1, wherein a wobble deviation at the beginning point of the wobbled track on the recording track in the recording layer of the information recording medium only when the groove recording system is selected is to be a mirror reverse of the wobble deviation at the beginning point of the wobbled track on the recording track in the recording layer of the information recording medium only when the land recording system is selected.

3. The method according to claim 1, wherein the method includes setting a shape of a wobble on the wobbled track on the recording track in the recording layer of the information recording medium, such that the shape of the wobble on the wobbled track, only when the groove recording system is selected, is a mirror reverse of the shape of the wobble on the wobbled track only when the land recording system is selected.

4. A method for reproducing information from an information recording medium comprising a recording layer including a land track and a groove track that is closer to an incident laser beam than the land track, such that (i) information is recorded to a recording track of the recording layer according to a selection of one of a land recording system, which allows information to be recorded only on the land track as the recording track, and a groove recording system, which allows information to be recorded only on the groove track as the recording track, (ii) the recording track to which the information is recorded has a wobbled track including a wobble and address information previously added to the wobble by performing MSK (Minimum Shift Keying) modulation and HMW (Harmonic Modulated Wave) modulation to a reference frequency signal of the wobble, and (iii) the wobbled track, which includes the wobble, has previously been formed such that a first wobble deviation of the wobble at a beginning point of the wobbled track has been previously been set so that a physical direction toward which the first wobble deviation starts from the beginning point of the wobbled track only when the land recording system is selected is a mirror reverse of a physical direction toward which the first wobble deviation starts from the beginning point of the wobbled track only when the groove recording system is selected, the method for reproducing information comprising:

reproducing a signal from the wobble by tracking only on the land track when the land recording system is selected; and reproducing a signal from the wobble by tracking only on the groove track when the groove recording system is selected, wherein a polarity of the signal reproduced from the wobble when the land recording system is selected is identical to a polarity of the signal reproduced from the wobble when the groove recording system is selected.

* * * * *